United States Patent [19]

Lockhart et al.

[11] Patent Number: 4,986,356

[45] Date of Patent: Jan. 22, 1991

[54] METHOD OF REMOVING POLYMER GELS FROM A PETROLEUM RESERVOIR

[75] Inventors: Thomas P. Lockhart, San Donato Milanese; Giovanni Burrafato, Tavazzano, both of Italy

[73] Assignees: Eniricherche S.p.A.; AGIP S.p.A., both of Milan, Italy

[21] Appl. No.: 477,120

[22] Filed: Feb. 7, 1990

Related U.S. Application Data

[63] Continuation of Ser. No. 283,740, Dec. 13, 1988, abandoned.

[30] Foreign Application Priority Data

Feb. 5, 1988 [IT] Italy ................ 19318 A/88

[51] Int. Cl.$^5$ .................. E21B 37/00; E21B 43/22
[52] U.S. Cl. ................. 166/300; 166/305.1; 166/312; 252/8.551; 252/8.552
[58] Field of Search ............. 166/270, 271, 273, 274, 166/275, 281, 305.1, 308, 312, 300; 252/8.551, 8.552, 8.554

[56] References Cited

U.S. PATENT DOCUMENTS

| | | | |
|---|---|---|---|
| 3,330,347 | 7/1967 | Brown et al. | 166/270 |
| 3,522,844 | 8/1970 | Abdo | 166/270 |
| 4,083,407 | 4/1978 | Griffin, Jr. et al. | 166/291 |
| 4,096,914 | 6/1978 | McLaughlin et al. | 252/8.552 X |
| 4,488,601 | 12/1984 | Hammett | 166/295 X |
| 4,609,475 | 9/1986 | Halon et al. | 252/8.552 |
| 4,648,456 | 3/1987 | Lamb et al. | 166/305.1 X |
| 4,770,796 | 9/1988 | Jacobs | 166/307 X |
| 4,809,781 | 3/1989 | Hoefner | 166/305.1 |

*Primary Examiner*—George A. Suchfield
*Attorney, Agent, or Firm*—Hedman, Gibson, Costigan & Hoare

[57] ABSTRACT

When used as occlusion agents or to cause fractures in a petroleum reservoir, polymer gels crosslinked with polyvalent metal ions can be removed by the use of special complexing agents.

13 Claims, No Drawings

METHOD OF REMOVING POLYMER GELS FROM A PETROLEUM RESERVOIR

This is a continuation of Ser. No. 283,740, filed Dec. 13, 1988, and now abandoned.

This invention relates to a method of removing polymer gels in a petroleum reservoir.

The normal primary recovery method for petroleum makes use of its natural tendency to escape from a reservoir owing to the pressure of the reservoir, but allows only partial extraction of the crude contained therein. To increase the quantity of petroleum extractable from an oil reservoir it is usual to employ assisted recovery techniques, which consist most frequently of introducing into the reservoir a fluid which passes through the pores in the rock and transports the crude contained therein to the production wells.

Water flooding is the most frequently used assisted recovery method because of its low cost and ease of implementation. The main problem connected with the water flooding method is that the reservoir rock is often comprised of zones of different permeability and thus the water tends to pass preferentially through those zones of higher permeability, leaving substantially unrecovered the petroleum resident in the zones of lesser permeability, which are bypassed and remain unswept by the water flood.

A solution to this problem is to partially or completely occlude the higher permeability zones after their petroleum has been extracted by a water flood so that the water injected subsequently will be caused to flow to the less permeable zones bypassed previously. Obviously, such occlusions would serve also for the enhanced recovery of petroleum from a reservoir employing other well-known techniques, such as polymer or surfactant flooding, based on the use of an injected fluid to sweep crude oil from a reservoir.

This occlusion can be carried out by various methods, most of which are based on the use of polymer gels. The gels most widely used are those obtained from water-soluble polymers crosslinkable with polyvalent metal ions. Commonly used polymers of this type are, for example, polyacrylamides, partially hydrolyzed polyacrylamides, and copolymers of acrylamide with vinyl comonomers such as acrylamide-N-vinylpyrrolidone and sodium acrylamido-2-methylpropanesulphonate. Other polymers frequently used are polysaccharides, in particular xanthan and scleroglucan, and cellulose-based polymers such as hydroxyethylcellulose, carboxymethylcellulose and carboxymethylhydroxyethylcellulose. Examples of polyvalent metal ions generally used in crosslinking polymers are $CR^{+3}$, $Al^{+3}$, $Ti^{+4}$, $Zn^{+2}$, $Fe^{+2}$, $Fe^{+3}$, $Sn^{+4}$.

There are generally two methods of introducing the gel into the reservoir. The first is to inject a polymer solution which is already surface-gelled, while the second is based on in-situ gel formation. Although surface-gelled polymer solution can be more selectively positioned in the higher permeability zones of a reservoir, in-situ gelling is generally preferred to the surface-gelled polymer because the ungelled solution can penetrate more deeply into the reservoir.

There are various in-situ gelling methods. In the case, for examples, of polymers crosslinkable with $Al^{+3}$, the gel is formed by injecting into the reservoir in two successive steps an aqueous polymer solution and an aqueous solution of $Al^{+3}$, generally as aluminum citrate; gelatin occurs when the two solutions mix within the reservoir. In the case of polymers crosslinked with $Cr^{+3}$, it is usual to feed the polymer together with chromium in a higher oxidation state unreactive toward crosslinking the polymer (for example, bichromate) and then to introduce a solution of a suitable reducing agent such as thiourea or thiosulphite. Reduction of the chromium to $CR^{+3}$, leads to gelatin.

Polymer gels crosslinked with polyvalent metal ions are also used in some instances, when fed into the well under pressure as aqueous high-viscosity solutions, to form fractures in the reservoir rock in order to facilitate the recovery of petroleum. Other uses of gels in the petroleum field include well completion, sealing abandoned wells, and sand consolidation.

A problem connected with the use of polymer gels in a petroleum reservoir which has still not been solved satisfactorily is that of removing the gelled polymers when they have performed their task, or at other times if this appears desireable. For example, if using such gels as occlusion agents for permeability modification purposes, various situations can arise which would make it desirable to remove the gel from the area occupied by it, such situations can be, for example:

(a) incorrect positioning of the gel in the reservoir;
(b) occlusion of zones which still contain petroleum;
(c) the need to replace a deteriorated gel with fresh gel;
(d) change of petroleum recovery strategy for the reservoir;
(e) inadvertant, undesireable formation of the gel within the well itself.

A convenient method of removing a gelled solution would also be of use for cleanup of the above-ground well site and equipment during or after the injection of gellable compositions into a reservoir.

It is known in the art to remove gelled polymers from the occupied area by methods based on the use of oxidizing agents and strong acids or bases. For example, U.S. Pat. No. 4,569,393 describes the use of sodium hypochlorite, GB No. 1,337,651 describes the use of other oxidizing agents including potassium permanganate, and GB No. 2,165,567 describes the use of organic peroxide oxidizing agents. However, the use of said known agents is not completely satisfactory because they can damage the reservoir and alter the crude it contains, and because they present a health risk to the personnel using them. These agents act by degrading the polymer and, because part of the polymer treated with said agents can remain in the reservoir in the form of an insoluble residue, they can prevent the complete reopening of the occluded zone.

It has now been found possible to overcome the drawbacks of the known art and to remove (in the sense of degelling) polymer gels in a petroleum reservoir which have been crosslinked with polyvalent metal ions, by the use of particular complexing agents. More particularly, according to the present invention, said gels can be degelled by a process consisting of bringing the gel in the well into contact with an aqueous solution of a complexing agent able to form with the polyvalent metal ion a coordination complex which is thermodynamically more stable than that which the ion forms with the polymer. Said complexing agents can be either organic or inorganic in nature.

In particular, as organic complexing agents, compounds can be used having at least two identical or different functional groups containing O, N, or S, and preferably chosen from the carboxyl, amino, pyridine, imidazole, hydroxyl, and sulphydryl groups. The carboxyl groups can be present either in acid or neutralized form, and the amino groups can be primary, secondary, or tertiary. In a preferred form of the invention, the organic complexing agents are carboxylic acids with from 2 to 4 carboxyl groups, either as such or as alkaline metal salts, or are amino acids or hydroxyacids, or are alkyleneamines, or polyalkyleneamines.

Examples of complexing agents useful for the purposes of the present invention are:
trisodium citrate ($Na_3$ citrate)
disodium oxalate ($Na_2$ oxalate)
disodium ethylenediaminetetraacetate ($Na_2$ EDTA)
tartaric acid
malonic acid
maleic acid
citric acid
oxalic acid
salicylic acid
gylcine
glutamic acid
aspartic acid
alpha-amino-n-butyric acid
methionine
serine
threonine
ethylenediamine
triethylenetetramine
diethylenetriamine
tris(2-aminoethyl)amine Inorganic complexing agents suitable for the purpose can be chosen from phosphorous compounds such as phosphoric and organophosphonic acids and their alkaline salts such as, for example sodium pyrophosphate, alkaline tripolyphosphate, inorganic bases such as ammonium hydroxide, and fluorides of the alkaline metals, for example potassium fluoride.

Some of said complexing agents are used in the art (U.S. Pat. Nos. 3,926,258, 4,488,601, and 3,762,476) to delay the formation of the gel and allow it to take a deeper position in the reservoir. In contrast, according to the objects of the present invention, the complexing agents act on the already gelled polymer within the well to cause its complete and irreversible degelation.

The method of the present invention can be generally used to remove all gels which have been formed from natural or synthetic water-soluble polymers by crosslinking with a polyvalent metal ion.

In particular the method of the present invention is preferably used to remove gels deriving from acrylamide polymers or copolymers, or from polysaccharides, crosslinked by means of $Cr^{+3}$. Said gels are generally obtained from polymers having a molecular weight of between 200,000 and 40,000,000 g/mol and are characterized by a polymer concentration of between 500 and 20,000 ppm and a $Cr^{+3}$ concentration of between 10 and 3000 ppm.

The degelling of crosslinked polymers is implemented in practice by bringing into contact, either in one portion or gradually with time, an aqueous solution of the complexing agent containing a quantity of complexing agent such that the molar ratio of complexing agent to crosslinking metal ion is at least 1:50 and preferably varies from 1:1 to 50:1.

If the reservoir is particularly rich in metal ions which, as is the case with $Ca^{+2}$, could cause precipitation of certain complexing agents from their aqueous solutions, it is convenient to use a larger quantity of the complexing agent, in order to ensure that the quantity necessary for degelling the polymer remains in solution.

The concentration of the aqueous solution of the complexing agent is not critical for the present invention. One can, for example, use solutions having a concentration of complexing agent from 100 to 100,000 ppm, and preferably from 1000–10,000 ppm. Said solutions act conveniently at the typical reservoir temperatures (between 20° and 200° C.) and, when operating under the preferred conditions, the gel is completely and irreversibly degelled within a time period varying from less than 1 to 15 days. The polymer degelled in this manner is in the form of a flowable liquid which can be easily removed from the previously occluded zone.

The method of the present invention therefore enables complete reopening of the occluded zone to be obtained in a simple and inexpensive manner. In addition, in contrast to the methods used in the art, it does not degrade the polymer and in no way damages the reservoir. The examples given hereinafter are for illustrative purposes only, and are in no way intended to be taken as limitative of the invention itself.

EXAMPLE 1

The gel preparation and subsequent treatments described in this and the other examples were carried out in suitable closed containers, as commonly accepted for the study of the behavior of gels in the assisted recovery of petroleum.

An aqueous solution of 10,000 ppm (by weight) of commercial polyacrylamide (Aldrich, average molecular weight 5,000,000–6,000,000, approximately 1% hydrolyzed) was left under slight stirring overnight to ensure maximum dispersion of the polymer molecules. It was then filtered through a 5 micron Millipore filter to remove any polymer microgel particles which may have been present. An aqueous solution of $CrCl_3$ containing 1000 ppm of $Cr^{+3}$ was prepared separately and left at ambient temperature until the blue coloration characteristic of the $Cr(H_2O)_6^{+3}$ ion had appeared. Three test-tubes fitted with screw-top enclosures were each filled with 8 ml of polyacrylamide solution, with 0,5 ml of $CrCl_3$ solution and with 1,5 ml of distilled water in order to obtain three gelling solutions each containing 8000 ppm of polyacrylamide and 50 ppm of $Cr^{+3}$. The solutions were then left to gel at ambient temperature for 16 hours.

One of the gels obtained was left as such to serve as the first control. Water in a quantity equal to 10% of the gel volume was added to another gel to serve as a second control. An aqueous solution containing 10,000 ppm of $Na_2EDTA$ was added to the third gel in quantity equal to 10% of the gel volume, to yield a final concentration, after diffusion of the degelling agent throughout the gel, of 1000 ppm of $Na_2EDTA$ (calculated for the total sample volume gel+solution).

The gel to which water and that to which $Na_2EDTA$ were added were then left at ambient temperature and monitored by gently inverting the test-tubes twice a day so as not to mechanically damage the gel. After 7 days, the gel to which the $Na_2EDTA$ solution had been added became a flowable liquid containing no residual gel structure, and was characterized by a violet color typical of the $Cr(EDTA)^{+3}$ complex. UV analysis of this degelled solution in fact showed 2 absorption peaks at 393 and 548 nm, corresponding to the known spectrum of the Cr(EDTA)+'complex. In contrast, the control gels were still unchanged and stable after 80 days.

EXAMPLE 2

Aqueous solution of the complexing agents $Na_3$citrate, $Na_2$oxalate and $Na_2$EDTA of concentration 10,000 ppm were added to 3 gel samples prepared as described in Example 1. The volume of solution of the complexing agent added was 10% of the gel volume so that, after allowing for diffusion through the gel, a complexing agent concentration of 1,000 ppm was obtained. To reference sample were prepared as described in Example 1, together with a comparison sample consisting of gel with 10% by volume of a 10,000 ppm solution of Na acetate added. The gels thus treated were left at ambient temperature (20° C.) and examined twice a day as described in the previous example.

In order to evaluate the effect of temperature on the degelation process, additional samples were prepared and stored at 60° C. after treating with solutions of degelling agents. Additional reference samples as described in Example 1 were also prepared for this series of degelation samples. The effect of gel age on the degelation process (that is, age of the gel prior to treatment with the degelling solution) was evaluated for other gel samples which were left to age for 5 days prior to treating them with degelling solutions.

The results of these degelation experiments are shown in Table 1.

The reference gels all proved to be stable under the test conditions, while the gels treated with the complexing agents $Na_2$EDTA, $Na_3$citrate, and $Na_2$oxalate underwent complete degelation under all conditions evaluated. The time to degel was shorter at 60° C. than at 20° C. The gels aged for 5 days prior to degelling treatment required somewhat longer time to degel. The gel treated with Na acetate, an organic compound with only one functional group, remained completely unaltered both at 20° and at 60° C.

EXAMPLE 3

A gel sample prepared as describe in Example 1 was left to age for 30 days. It was then treated with 10% by volume of a 10,000 ppm solution of $Na_3$citrate. After 4 days at 60° C., the gel was completely degelled. On comparing this result with those of the preceding example it can be deduced that the degelling time remains short even if the gel has been left to age for a long period.

EXAMPLE 4

A series of gels prepared as described in Example 1 and left to age for 4 days were treated with aqueous solutions (in quantities equal to 10% of the gel volume) of the complexing agents $Na_2$EDTA, $Na_3$citrate, and $Na_2$oxalate at concentration of 1000 ppm and 100 ppm so as to obtain concentration of 100 and 10 ppm respectively after the solution had diffused through the gel. For comparison purposes, a test with Na acetate was also carried out. The results are shown in Table 2.

Starting with solutions degelling agent of 1000 ppm concentration, fluid solutions showing only slight retention of gel structure were obtained in 10-14 days, whereas starting with solutions of 100 ppm concentration there was a reduction in viscosity after 50 days, but with partial preservation of the gelled structure. These tests indicate that, even at low proportions of complexing agent to $Cr^{+3}$ in the gel, the gels are rendered substantially fluid in a reasonable period of time. Such fluid gels, although they may be more difficult to mobilize than a perfectly degelled, fluid solution, should be mobile under pressure within the reservoir, and thus it should be possible to remove them from the zones in which they have been formed.

EXAMPLE 5

Three gel samples prepared as described in Example 1 and left to age for 30 days were treated with aqueous solutions of the complexing agents oxalic acid, citric acid and ethylenediamine of 10,000 ppm concentration as described in the preceding examples. The results obtained are shown in Table 3. The results demonstrate that neutral complexing agents (ethylenediamine) and the acid forms of carboxylate degelling agents are also effective agents for the scope of the invention.

EXAMPLE 6

To three gel samples prepared as described in Example 1 were added solutions (in a quantity equal to 10% of the gel volume) of the inorganic degelling agent sodium pyrophosphate ($Na_4P_2O_7$), potassium fluoride (KF), and ammonia ($NH_3$) at concentration reported in table 4. Whereas pyrophosphate produced a rapid degellation, the weaker complexing agents fluoride and ammonia produced slower or partial degelation.

EXAMPLE 7

To demonstrate that the degellation method of the present invention functions with polyacrilamides of a higher degree of hydrolysis a sample of polyacrylamide 10% hydrolyzed was prepared by base hydrolysis from the commercial polyacrylamide employed in the previous examples. Aqueous gels comprised of 8000 ppm of this hydrolyzed polymer and 100 ppm $Cr^{+3}$ were prepared as described in example 1 and treated with solutions of the following degelling agents: $Na_2$EDTA, ethylenediamine, $Na_2$malonate, $Na_2$oxalate, $Na_3$citrate, and sodium pyrophosphate. The results show that comparable degellation times are obtained with this polyacrylamide polymer.

TABLE 1

| Complexing (10,000 ppm solution) | Molar ratio compl. agent:$Cr^{+3}$ | Gel ageing[a] (days) | Degelling time (days) 20° C. | 60° C. |
|---|---|---|---|---|
| $Na_2$EDTA | 3:1 | 1 | 7 | 2 |
| " | " | 5 | 16 | 4 |
| $Na_3$ citrate | 3,5:1 | 1 | 8 | 2 |
| " | " | 5 | 10 | 3 |
| $Na_2$ oxalate | 8:1 | 1 | 7 | 2 |
| " | " | 5 | 10 | 3 |
| Na acetate | 13:1 | 1 | >80[b] | >80[b] |
| " | " | 5 | " | " |

[a] the gel used is polyacrylamide (8000 ppm)/$Cr^{+3}$ (50 ppm)
[b] no change is observed in the gel structure

TABLE 2

| Complexing agent | Complexing agent solution conc. (ppm) | Molar ratio compl. agent:$Cr^{+3}$ | Degelling time[a] at 60° C. (days) |
|---|---|---|---|
| $Na_2$EDTA | 1000 | 0.3:1 | 15 |
| " | 100 | 0.03:1 | >30 |
| $Na_3$ citrate | 1000 | 0.35:1 | 10 |
| " | 100 | 0.035:1 | >30[b] |
| $Na_2$ oxalate | 1000 | 0.8:1 | 10 |
| " | 100 | 0.08:1 | >30[b] |
| Na acetate | 1000 | 1.3:1 | >50[c] |

TABLE 2-continued

| Complexing agent | Complexing agent solution conc. (ppm) | Molar ratio compl. agent:$Cr^{+3}$ | Degelling time[a] at 60° C. (days) |
|---|---|---|---|
| " | 100 | 0.13:1 | " |

[a] the gel used is polyacrylamide (8000 ppm)/$Cr^{+3}$ (50 ppm), aged 4 days
[b] a viscosity reduction is observed, with partial retention of the gel structure
[c] no change in gel structure is observed.

TABLE 3

| Complexing agent | Molar ratio complexing agent:$Cr^{+3}$ | Degelling time[a] at 60° C. (days) |
|---|---|---|
| citric acid | 4.5:1 | 4 |
| oxalic acid | 12:1 | 6 |
| ethylenediamine | 17:1 | 6 |

[a] the gel used is polyacrylamide (8000 ppm)/$Cr^{+3}$ (50 ppm), aged 30 days

TABLE 4

| Complexing agent | Complexing agent solution concentration (ppm) | Degelling time[a] at 60° C. (days) |
|---|---|---|
| $Na_4P_2O_7$ | 10000 | 2 |
| KF | 100000 | 26[b] |
| $NH_3$ | 50000 | 9[b] |

[a] The gel used was polyacrylamide (8000 ppm)$Cr^{+3}$ (50 ppm) aged 25 days prior to treatment with the complexing agent solution
[b] These solutions were highly fluid, but retained a slight gel structure.

TABLE 5

| Complexing agent | Molar ratio Complexing agent:$Cr^{+3}$ | Degelling time[a] at 60° C. (days) |
|---|---|---|
| $Na_2EDTA$ | 3:1 | 15 |
| Ethylenediamine | 9:1 | 25 |
| $Na_2$malonate | 9:1 | 12 |
| $Na_2$oxalate | 9:1 | 4 |
| $Na_3$citrate | 3:1 | 5 |
| $Na_4P_2O_7$ | 9:1 | 1 |

[a] The gel used was 10% hydrolyzed polyacrylate (8000 ppm)/$Cr^{+3}$ (100 ppm)

We claim:

1. A method for removing from a petroleum reservoir natural or synthetic water-soluble polymer gels comprising an acrylamide polymer or copolymer or a polysaccharide of molecular weight between 200,000 and 40,000,000 crosslinked with a $Cr^{+3}$ ion, characterised by bringing the gel into contact with an aqueous solution of an organic or inorganic complexing agent able to form with the polyvalent metal ion a coordination complex which is thermodynamically more stable than that which the metal ion forms with the polymer and thereby irreversibly degelling said polymer gel.

2. A method as claimed in claim 1, characterised in that the polymer concentration in the gel varies from 500 to 20,000 ppm and the $Cr^{+3}$ concentration varies from 10 to 3000 ppm.

3. A method as claimed in claim 1, characterised in that the complexing agent is an organic compound with at least two identical or different functional groups containing O, N or S.

4. A method as claimed in claim 3, characterised in that the functional groups are chosen from the groups: carboxyl, either in the acid or neutralized form, primary amino, secondary amino, tertiary amino, pyridine, imidazole, hydroxyl, sulphydryl.

5. A method as claimed in claim 4, characterised in that the complexing agent is chosen from carboxylic acids having from 2 to 4 carboxyl groups, either as such or as alkaline metal salts, amino acids, hydroxyacids, alkyleneamines and polyalkyleneamines.

6. A method as claimed in claim 5, characterised in that the complexing agent is chosen from:
trisodium citrate
disodium ethylenediaminetetraacetate
disodium oxalate
tartaric acid
malonic acid
maleic acid
citric acid
oxalic acid
salicylic acid
gylcine
glutamic acid
aspartic acid
alpha-amino-n-butyric acid
methionine
serine
threonine
triethylenetetramine
diethylenetriamine
tris(2-aminoethyl)amine
ethylenediamine 7. A method as claimed in claim 1, characterised in that the inorganic complexing agent is chosen from phosphorus acids either as such or as their alkaline salts, alkaline tripolyphosphates, and ammonium hydroxide.

8. A method as claimed in claim 7, characterised in that the inorganic complexing agent is sodium pyrophosphate.

9. A method as claimed in claim 1, characterised in that the molar ratio of complexing agent to polyvalent metal ion is at least 1:50.

10. A method as claimed in claim 9, characterised in that the molar ratio of complexing agent to polyvalent metal ion varies from 1:1 to 50:1.

11. A method as claimed in claim 1, characterised in that the aqueous solution for the complexing agent has a concentration of between 100 and 100000 ppm.

12. A method as claimed in claim 11, characterised in that the aqueous solution of the complexing agent has a concentration of between 1000 and 10000 ppm.

13. A method as claimed in claim 1, characterised in that the aqueous solution of the complexing agent is fed either in a single portion or incremetally.

* * * * *